United States Patent
Wilson et al.

(10) Patent No.: US 8,316,317 B2
(45) Date of Patent: *Nov. 20, 2012

(54) SYSTEM AND METHOD FOR NAVIGATING IN A DISPLAY WINDOW

(75) Inventors: Sean David Drew Wilson, Waterloo (CA); Rouzbeh Noori, Waterloo (CA); Alvin Yulo, Waterloo (CA); Carl Edward Kilgour Pacey, Kitchener (CA); Michael Busheikin, Calgary (CA)

(73) Assignee: Research In Motion Limited, Waterloo (CA)

( * ) Notice: Subject to any disclaimer, the term of this patent is extended or adjusted under 35 U.S.C. 154(b) by 604 days.

This patent is subject to a terminal disclaimer.

(21) Appl. No.: 12/538,984

(22) Filed: Aug. 11, 2009

(65) Prior Publication Data

US 2009/0300536 A1   Dec. 3, 2009

Related U.S. Application Data

(63) Continuation of application No. 11/420,250, filed on May 25, 2006, now Pat. No. 7,607,105.

(51) Int. Cl.
   *G06F 13/00* (2006.01)
   *G06F 15/00* (2006.01)
(52) U.S. Cl. .................... 715/781; 715/738
(58) Field of Classification Search ............ 715/781, 715/738, 762–765, 716, 774–777, 853
See application file for complete search history.

(56) References Cited

U.S. PATENT DOCUMENTS

| | | | |
|---|---|---|---|
| 5,438,662 A | 8/1995 | Randall | |
| 5,860,073 A | 1/1999 | Ferrell | |
| 6,002,398 A * | 12/1999 | Wilson | 715/777 |
| 6,240,421 B1 | 5/2001 | Stolarz | |
| 2002/0174202 A1 | 11/2002 | Kohyama et al. | |
| 2004/0164973 A1 | 8/2004 | Nakano et al. | |
| 2006/0224992 A1 * | 10/2006 | Rossi et al. | 715/781 |

FOREIGN PATENT DOCUMENTS

| | | |
|---|---|---|
| EP | 0657799 A1 | 6/1995 |
| EP | 1004957 A1 | 5/2000 |
| EP | 1215580 A2 | 6/2002 |

OTHER PUBLICATIONS

Examiner's Report dated Sep. 2, 2010.

* cited by examiner

*Primary Examiner* — Cao "Kevin" Nguyen
(74) *Attorney, Agent, or Firm* — Ridout & Maybee LLP

(57) ABSTRACT

Navigation between a plurality of property sheets on a display of a mobile electronic device, each of the property sheets having a tab index and a layout defining a plurality of elements. One of the property sheets is a displayed property sheet and one of the elements is a current active element. Navigation includes (i) storing the tab index of the displayed property sheet as a current tab index; (ii) detecting a soft key event; regardless of which of the elements is a current active element, (iii) modifying the current tab index based on a soft key identifier of the soft key event to create an updated tab index; and (iv) displaying another property sheet of the plurality of property sheets on the display, the another property sheet having a tab index equal to the updated tab index.

26 Claims, 4 Drawing Sheets

SYSTEM AND METHOD FOR NAVIGATING IN A DISPLAY WINDOW

CROSS-REFERENCE TO RELATED APPLICATIONS

This application is a continuation of U.S. patent application Ser. No. 11/420,250 filed May 25, 2006, the contents of which are herein incorporated by reference in its entirety.

FIELD OF TECHNOLOGY

The present disclosure relates to applications operating upon mobile devices and, in particular, navigating in a display window.

BACKGROUND INFORMATION

Navigating between tabbed property sheets in a display window of a mobile device can be quite a cumbersome experience. One potential reason for this difficulty is that the concept of tabbed property sheets was originally designed for display on a traditional computer monitor and navigation between property sheets was accomplished using a mouse. The difficulty in applying this concept to mobile devices arises largely as a result of the reliance of mobile devices on input means such as a stylus or a directional pad.

For mobile devices having a stylus, navigation between tabbed property sheets in a display window can be accomplished by tapping the tab associated with the desired property sheet with the stylus. The user must use both hands to accomplish this task as opposed to working directly with the user interface of the mobile device, which can be done with one hand.

For mobile devices having a directional pad, navigation between tabbed property sheets can be accomplished by moving through all of the elements in the current property sheet with the directional pad until the tabs (typically at the bottom of the display) are reached and then pressing the left or right keys of the directional pad to move to the tab corresponding to the desired sheet. The directional pad is intended for use in navigating between elements of a property sheet. At any given time, one of the elements within the property sheet may be the "active" element, e.g. the current control position or the cursor position, and the directional pad is used to change the active element to the next or previous element in the layout of the property sheet. Using the directional pad, one of the tabs may become the active element by cycling through all the other elements in the layout until that tab is reached. Once that tab has been "activated" as the active element, then the directional pad can be used to navigate between property sheets.

Some mobile device displays are also equipped with small left and right arrow buttons on the screen for revealing tabs that are not visible in the current display. Navigation to tabbed sheets that are not visible in the current display involves the further step of 'clicking' these arrow buttons with the stylus in order to reveal the hidden tabs. This action will not change the active element and the user must perform the further step of selecting the tab corresponding to the desired property sheet as described previously.

BRIEF DESCRIPTION OF THE DRAWINGS

Embodiments will now be described, by way of example only, with reference to the attached Figures, wherein.

Like reference numerals are used throughout the Figures to denote similar elements and features.

DETAILED DESCRIPTION

Figure 1:
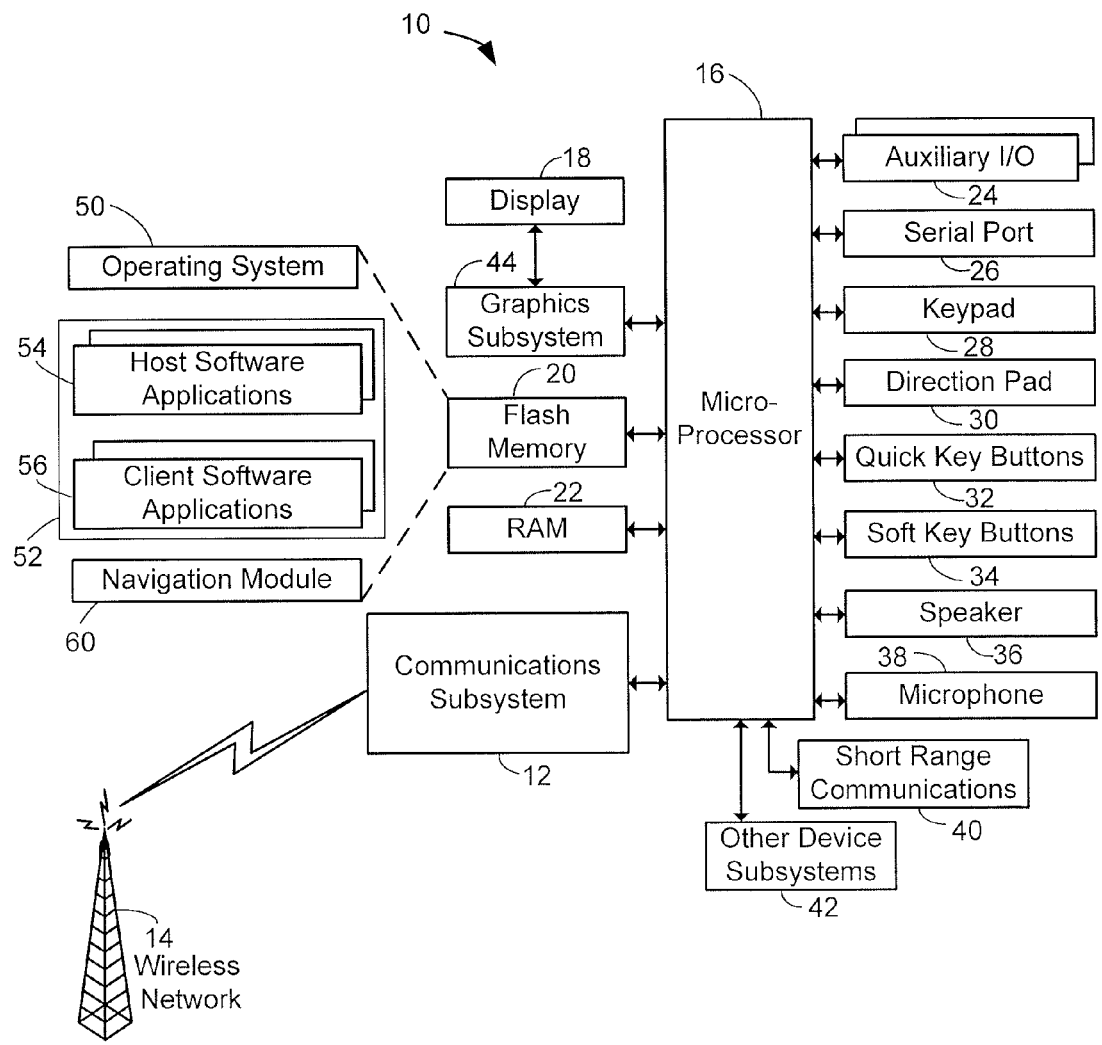
FIG. 1 is a block diagram of an electronic device.

The present disclosure describes methods, devices and computer program products for navigating between a plurality of property sheets on a display of a mobile electronic device. A particular property sheet is selected using soft keys. These soft keys may be selected via soft key buttons or soft key icons.

In one aspect, the present disclosure provides a method for navigating between a plurality of property sheets on a display of a mobile electronic device. Each of the property sheets has a tab index and a layout defining a plurality of elements. One of the plurality of property sheets is a displayed property sheet and one of the plurality of elements in the displayed property sheet is a current active element. The method includes the steps of storing the tab index of the displayed property sheet as a current tab index; detecting a soft key event; and regardless of which of the plurality of elements is the current active element, modifying the current tab index based on a soft key identifier of said soft key event to create an updated tab index; and displaying another property sheet of the plurality of property sheets on the display, the another property sheet having a tab index equal to the updated tab index.

In another aspect, the present disclosure provides a mobile electronic device. The device includes a display for displaying a displayed property sheet of a plurality of property sheets. Each of the property sheets has a tab index and a layout defining a plurality of elements. One of the plurality of elements is a current active element. The mobile electronic device further comprises a memory component for storing a tab index of the displayed property sheet, a user input device for initiating a soft key event; an operating system for detecting the soft key event; and a navigation module responsive to detection of the soft key event regardless of which of the plurality of elements is the current active element. The navigation module includes components for (i) modifying the current tab index based on a soft key identifier of said soft key event to create an updated tab index; and (ii) instructing the display to display another property sheet of the plurality of property sheets having a tab index equal to the updated tab index.

In yet another aspect, the present disclosure provides a computer program product having a computer-readable medium tangibly embodying computer executable instructions for navigating between a plurality of property sheets on a display of a mobile electronic device. Each of the property sheets has a tab index and a layout defining a plurality of elements. One of the plurality of property sheets is a displayed property sheet and one of the plurality of elements in the displayed property sheet is a current active element. The instructions include instructions for; instructions for storing the tab index of the displayed property sheet as a current tab index; instructions for detecting a soft key event; regardless of which of the plurality of elements is the current active element, instructions for modifying the current tab index based on a soft key identifier of the soft key event to create an updated tab index; and instructions for displaying another property sheet of the plurality of property sheets on the display, the another property sheet having a tab index equal to the updated tab index.

Other aspects and features of the present disclosure will be apparent to one of ordinary skill in the art in light of the following detailed description and drawings depicting one or more embodiments.

FIG. 1 shows a block diagram of an electronic device 10 to which example embodiments described herein may be applied. The electronic device 10 may comprise a communications subsystem 12 which communicates with a wireless network 14. The particular design of the communication subsystem 12 will be dependent upon the communication network in which the device is intended to operate.

The electronic device 10 may be a hand-held mobile electronic device 10 having at least one of data communication capabilities, voice communication capabilities and capabilities for communicating with other computer systems on the Internet. In various embodiments, mobile electronic device 10 may be a data communication device, a multiple-mode communication device configured for both data and voice communication, a mobile telephone, a mobile communication device, a PDA enabled for wireless communications, a 1-way or 2-way pager and any type of mobile wireless communication device. It should be appreciated however that the present disclosure is in no way limited to these example types of devices and may be implemented in other devices. Example embodiments may also be applied to non-wireless enabled devices.

The electronic device 10 includes a microprocessor 16 that controls the overall operation of the device. The microprocessor 16 interacts with communications subsystem 12 and also interacts with further device subsystems such as the display 18, flash memory 20, random access memory (RAM) 22, auxiliary input/output (I/O) subsystems 24 (which may include a stylus, for example), serial port 26, a keypad or keyboard 28, directional pad 30, quick key buttons 32, soft key buttons 34, speaker 36, microphone 38, a short-range communications subsystem 40, and any other device subsystems generally designated as 42. Of course, any combination of the above listed device subsystems may be used.

Some of the subsystems shown in FIG. 1 perform communication-related functions, whereas other subsystems may provide "resident" or on-device functions. Notably, some subsystems, such as display 18, keypad or keyboard 28, direction pad 30, quick key buttons 32 and soft key buttons 34 for example, may be used for both communication-related functions, such as entering a text message for transmission over a communication network, and device-resident functions such as a calculator or task list.

Operating system software 50 (such as, for example, the operating system Windows Mobile™ marketed by the Microsoft Corporation) and various software applications 52 used by the microprocessor 16 are, in one example embodiment, stored in a persistent store such as flash memory 20 or similar storage element. Software applications 52 may include a wide range of applications, including a text messaging application, a ring tone application, a contacts application, and/or a game application. Those skilled in the art will appreciate that the operating system 50 and software applications 52, or parts thereof, may be temporarily loaded into a volatile store such as RAM 22.

The microprocessor 16, in addition to its operating system functions, enables execution of software applications 52. The software applications 52 may include host software applications 54 and client software applications 56 on the device. Host software applications 54 will typically include a predetermined set of applications which control basic device operations and will normally be installed on the device 10 during manufacture.

One of the client applications 56 may be, for example, a wireless data communication application. The wireless data communication application may, for example, enable the receipt and transmission of electronic messages. In one embodiment, the wireless data communication application may provide for electronic messaging, i.e. E-mail, that is synchronised and coordinated with a remote electronic messaging server. Electronic messaging functions provided by the wireless data communication application may include composing messages, saving messages, and displaying messages. Other functions or features may include a contacts list or directory, a calendar application, a task list application, a web browser, and other modules or applications.

Each of the client applications 56 may be a self-contained stand-alone entity that may have been designed to operate upon a specific 'native' device. Each client application 56 is typically created and developed by a separate entity than the remainder of the mobile electronic device 10. The client application 56 may be associated with a native environment or device in association with which it was originally developed. Accordingly, the client application 56 may include the functions and features associated with its operation on its native device, but packaged as a stand-alone software entity designed to run on top of a third-party platform in a third-party device.

Alternatively, the client applications 56 may be a self-contained stand-alone entity that may have been designed to operate on a specific host device with a specific operating system. Such a client application 56 may still have been created and developed by a separate entity than the remainder of mobile device 10. Accordingly, such a client application 56 may include functions and features associated with known operation of the host device, but packaged as a stand-alone software entity.

Of course, further software applications 52 may also be loaded onto the device 10 through the wireless network 14, an auxiliary I/O subsystem 24, serial port 26, short-range communications subsystem 40 or any other suitable subsystem 42, and installed by a user in the RAM 22 or a non-volatile store for execution by the microprocessor 16. Such flexibility in application installation increases the functionality of the device and may provide enhanced on-device functions, communication-related functions, or both.

The device 10 also includes a navigation module 60. The navigation module 60 facilitates quick navigation amongst tabbed property sheets without requiring use of the auxiliary I/O subsystem 24 or the directional pad 30. The navigation module 60 is responsive to the soft key buttons 34 to provide one-touch movement between property sheets irrespective of which element in the display 18 is designated as the active element as will be described in greater detail below. Although the navigation module 60 is referred to as a "module" it will be appreciated that the functions of the navigation module 60 may be implemented through a variety of programming constructs, which in some embodiments may include subroutines, application programs, objects, or portions or combinations thereof. The use of the terms "module", "component", "object", or other such elements, to refer to software program elements should be considered as encompassing all such element as would be suitable in the circumstances, having regard to the programming environment, as will be understood by persons of ordinary skill in the art. It will also be appreciated that, although the navigation module 60 is shown separately for ease of illustration in FIG. 1, it may form a part of the operating system 50 and/or one or more application programs 52.

Figure 2:
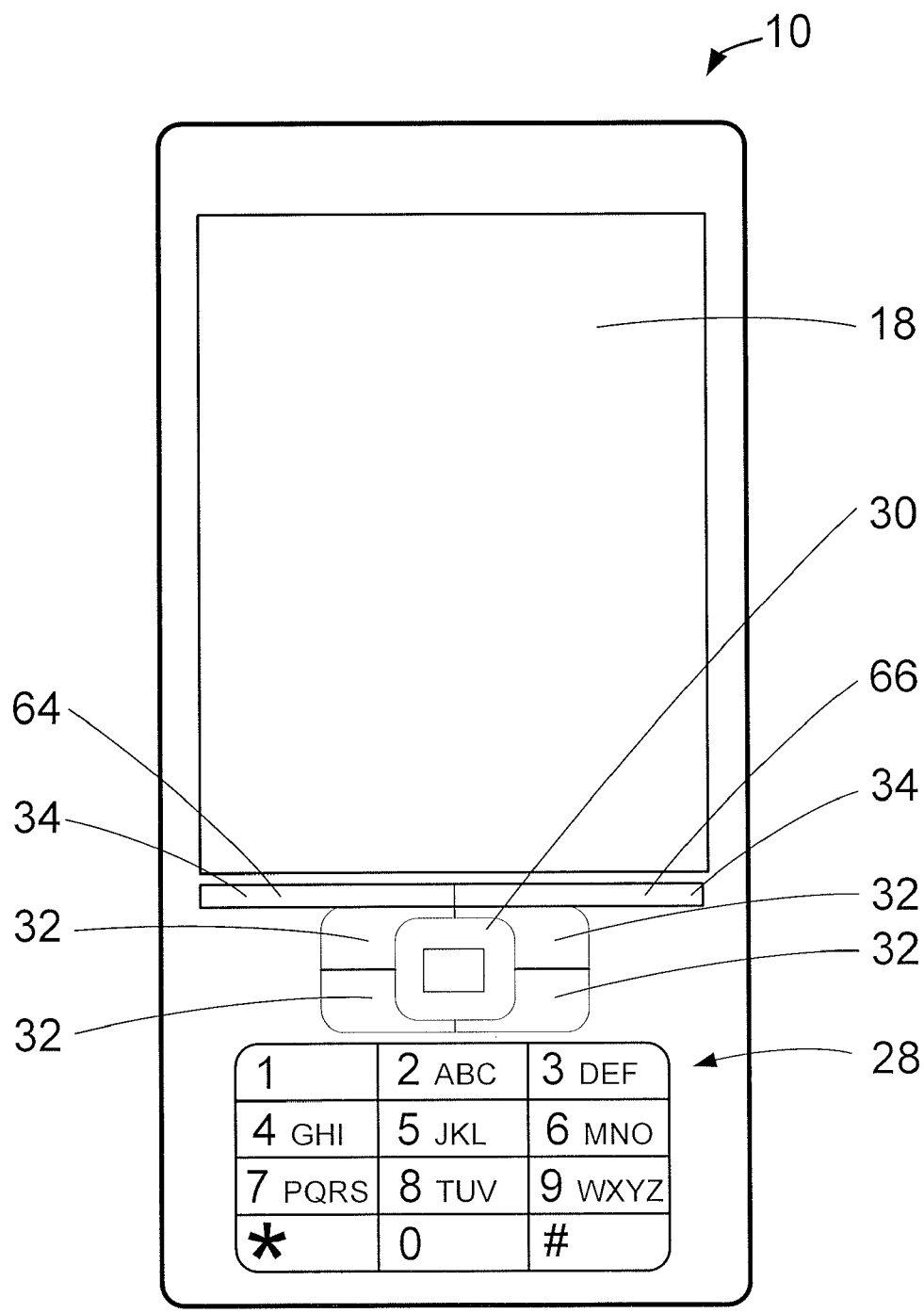
FIG. 2 diagrammatically shows the electronic device of FIG. 1.

Reference is now made to FIG. 2, which diagrammatically shows a front view of the device 10 of FIG. 1. As mentioned previously, the mobile device 10 may be provided with soft key buttons 34. Soft key buttons 34 may include a left soft key button 64 and a right soft key button 66. The soft key buttons 34 are multi-function buttons whose active function is context-dependent. The function of the key buttons 34 in a given context is typically indicated on the display screen 18 in the vicinity of the key buttons 34. The function of the key buttons 34 may be dependent upon the window being displayed on the display screen 18 or the software application 52 active on the display screen 18.

Figure 3:
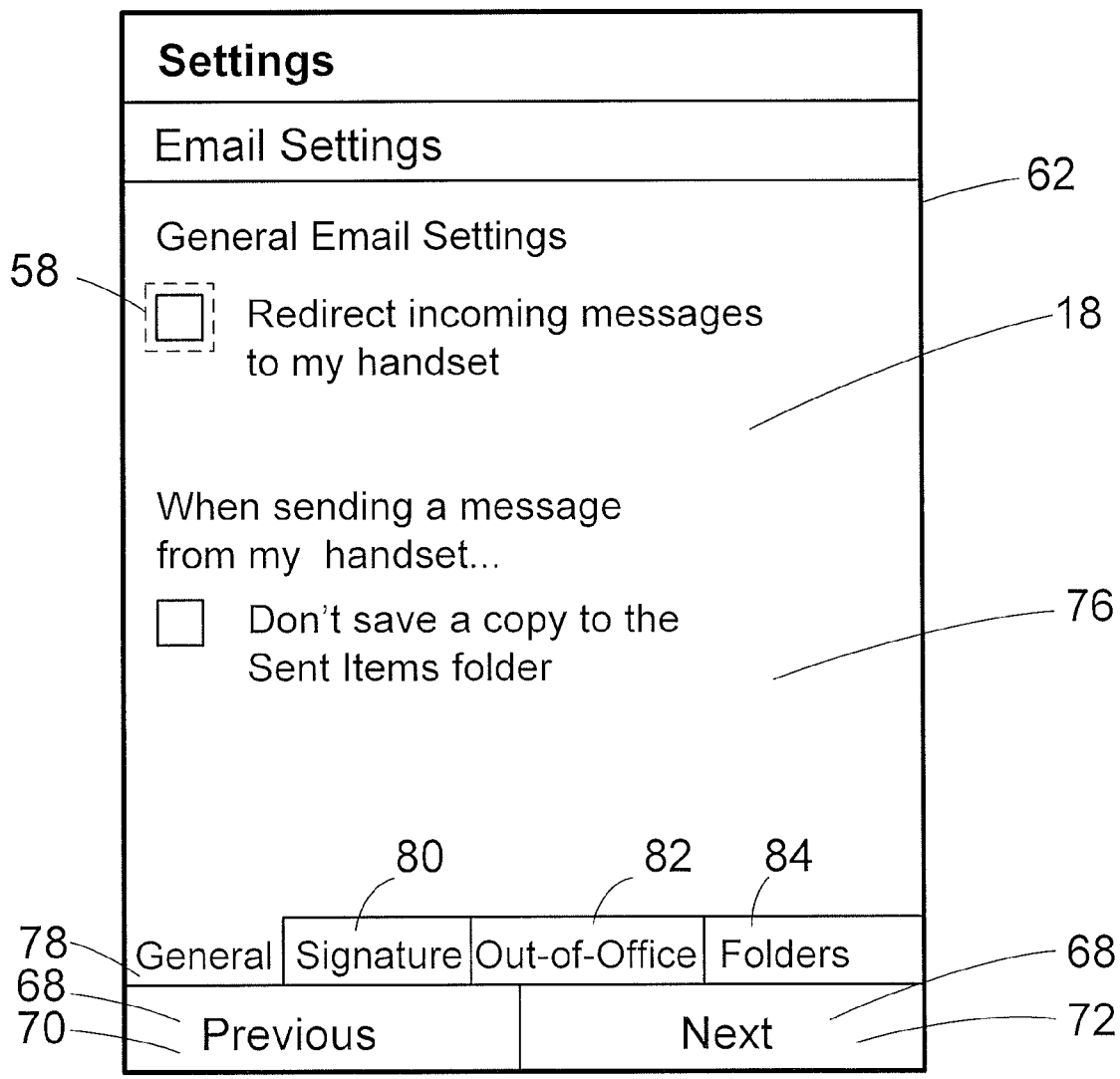
FIG. 3 illustrates a screenshot of a tabbed property sheet window.

Reference is now also made to FIG. 3, which illustrates a screenshot of a tabbed property sheet window 62. The soft key buttons 34 in this embodiment may be associated with soft key icons 68 on the display 18. Soft key icons 68 may include left soft key icon 70 (associated with left soft key button 64) and right soft key icon 72 (associated with right soft key button 66). Each icon corresponds to a property sheet navigation action (i.e. left and right). These icons 70 and 72 may be arranged as a soft key bar, as shown. Of course, in some embodiments the mobile device 10 may be provided with soft key icons 68 on the display 18 without soft key buttons 34. Where both soft key icons 72 and soft key buttons 34 are provided, the soft key icons 72 are located near the soft key buttons 34. The soft key buttons 34 may not physically labelled.

The operating system 50 may associate the soft key buttons 34 and their corresponding soft key icons 68 with soft key handles, such that when the operating system 50 recognizes activation of one of the soft key buttons 34 or soft key icons 68, the corresponding soft key handle is referenced for handling the soft key event. These soft key handles may be assigned to various actions. In typical usage, one soft key handle may be assigned to a single action and the other one of the soft key handles may be assigned to open a menu of actions. The operating system 50 may further provide a facility for changing the command or action assigned to a given soft key handle. This may allow an application developer to customize operation of the soft key buttons 34 to the particular application 52 running on the device 10.

Various ones of the software applications 52 may involve the display of property sheets. A property sheet is a dialog box defined by the operating system 50 that can be used to view or modify the attributes or properties of an object (e.g. an object that stores a particular email option). Due to the nature of these property sheets, the commands or actions assigned to the soft keys in other contexts may not suitable, and/or may not make sense in the context of all the property sheets. For example, a menu of actions for a first property sheet may not be applicable to a menu of actions for a second property sheet. Accordingly, the soft keys are typically left unassigned or disabled in the context of tabbed property sheets. In accordance with the present disclosure, the soft key handles reference the navigation module 60 for handling soft key events in the context of tabbed property sheets.

FIG. 3 illustrates a screenshot showing a plurality of property sheets. A displayed property sheet 76 is displayed and is associated with current tab 78 which, in the example embodiment shown, is labelled "General". Tabs associated with other property sheets are also shown: tab 80 (labelled "Signature"), tab 82 (labelled "Out-of-office") and tab 84 (labelled "Folders"). Each of these tabs has an associated property sheet which can be displayed by selecting the appropriate tab using, for example, the auxiliary input/output (I/O) subsystems 24 (which may include a stylus, for example). Of course, the particular labels and property sheets described herein are merely examples and any suitable labelling scheme may be used.

Each one of the plurality of tabbed property sheets has an associated tab index. With reference to the screenshot of FIG. 3, the current tab 78 labelled "General" might have a tab index of "1", the tab 80 might have a tab index of "2", the tab 82 might have a tab index of "3" and the tab 84 might have a tab index of "4". In this example embodiment, the tab indices increase sequentially from left to right, but could equally increase sequentially from right to left. Similarly, the tab indices need not be numbers but could be any other suitable indicator.

The tab index of the property sheet which is currently displayed is stored as a current tab index in a storage component, such as one of the memory components described previously (e.g. flash memory 20, RAM 22). The operating system 50 (FIG. 1) recognizes the occurrence of a soft key event (via a soft key handle), which is initiated by a user input device, e.g. when the user depresses either the left soft key button 64 or the right soft key button 66. Alternatively, the soft key event may be initiated by user selection of the left soft key icon 70 or right soft key icon 72 via, for example, the auxiliary input/output (I/O) subsystems 24 (which may include a stylus, for example). The operating system 50 informs the navigation module 60 of the occurrence of the soft key event.

The navigation module 60 may receive a soft key identifier corresponding to the soft key event from the soft key handle. If a left soft key button 64 or a left soft key icon 70 has been selected, the soft key identifier might be "left" (or any other suitable identifier). Likewise, if a right soft key button 66 or a right soft key icon 68 has been selected, the soft key identifier might be "right" (or any other suitable identifier). Alternatively, the identifier may be implicit in the identity of the soft key handle that messages the notification module 60 if separate soft key handles are designated for the left and right soft key buttons 64 and 66.

The navigation module 60 then retrieves the current tab index from memory and modifies it based on the soft key identifier. More specifically, if the soft key identifier is "left" and the current tab index is "3", the navigation module 60 subtracts "1" from the current tab index to give a current tab index of "2". Likewise, if the soft key identifier is "right" and the current tab index is "3", the navigation module 60 adds "1" to the current tab index to give a current tab index of "4". As mentioned previously, the tab indices could also increase sequentially from right to left. If this were the case, if the soft key identifier was "left" and the current tab index is "3", the navigation module 60 will add "1" to the current tab index to give a current tab index of "4". Likewise, if the soft key identifier was "right" and the current tab index is "3", the navigation module 60 will subtract "1" from the current tab index to give a current tab index of "2". Similar modification schemes could be applied if the tab indices were not numbers, but rather some other suitable indicator.

Once the navigation module 60 has modified the current tab index, it instructs the display 18 to display a property sheet having a tab index equal to the now updated current tab index.

The navigation module 60 is responsive to soft key events regardless of which of the plurality of elements is the current active element (i.e. regardless of what the user is doing or where the cursor is on the display). An example active element 58 is shown in FIG. 3. Further, when navigating between property sheets, a default active element may be set for a given property sheet such that, when the device 10 displays a new property sheet, the active element will not necessarily be the tab. For example, the default active element may be a text control of the property sheet. If the directional pad or a stylus were used to switch to a new property sheet (as described previously), the active element would be located at the property sheet tab and the user would have to move through the elements to get to a desired active element.

While left soft key icon 70 and right soft key icon 72 might display the text "previous" and "next", as shown in FIG. 3, it should be understood that any suitable text could be used (such as "left" and "right" and so on). Similarly, the text could be replaced by images of arrows or the like (thus dispensing with the need to translate text for use in other languages).

It should also be understood that the appearance and placement of the soft key icons 68 and soft key buttons 34 are not limited to the appearance and placement shown in FIG. 3. Further, it should be understood that as some mobile devices do not have buttons similar to soft key buttons 34, or do not always have such buttons accessible (e.g. swivel-type mobile phones), these devices would only utilize soft key icons 68.

As subsequent property sheets are displayed, the tabs themselves might also slide to the left and right as necessary so that at least the tab immediately to the left and right of the current tab is always visible (so that the user can see where they might potentially move to next). However, if this sliding functionality is not provided, it should be understood the soft key icons 68 or buttons 34 could be used to display property sheets associated with tabs which are hidden (i.e. off the screen).

It should be noted that while each one of the plurality of property sheets described herein has an associated tab shown, it should be understood that such tabs as not necessary. Each sheet may be identified by its tab index without actually displaying a physical tab.

It should be noted that while in the above description, the operating system 50 and other features are described as having the characteristics of Windows Mobile™, it should be understood that embodiments described herein could also be applied to other operating systems.

Figure 4:
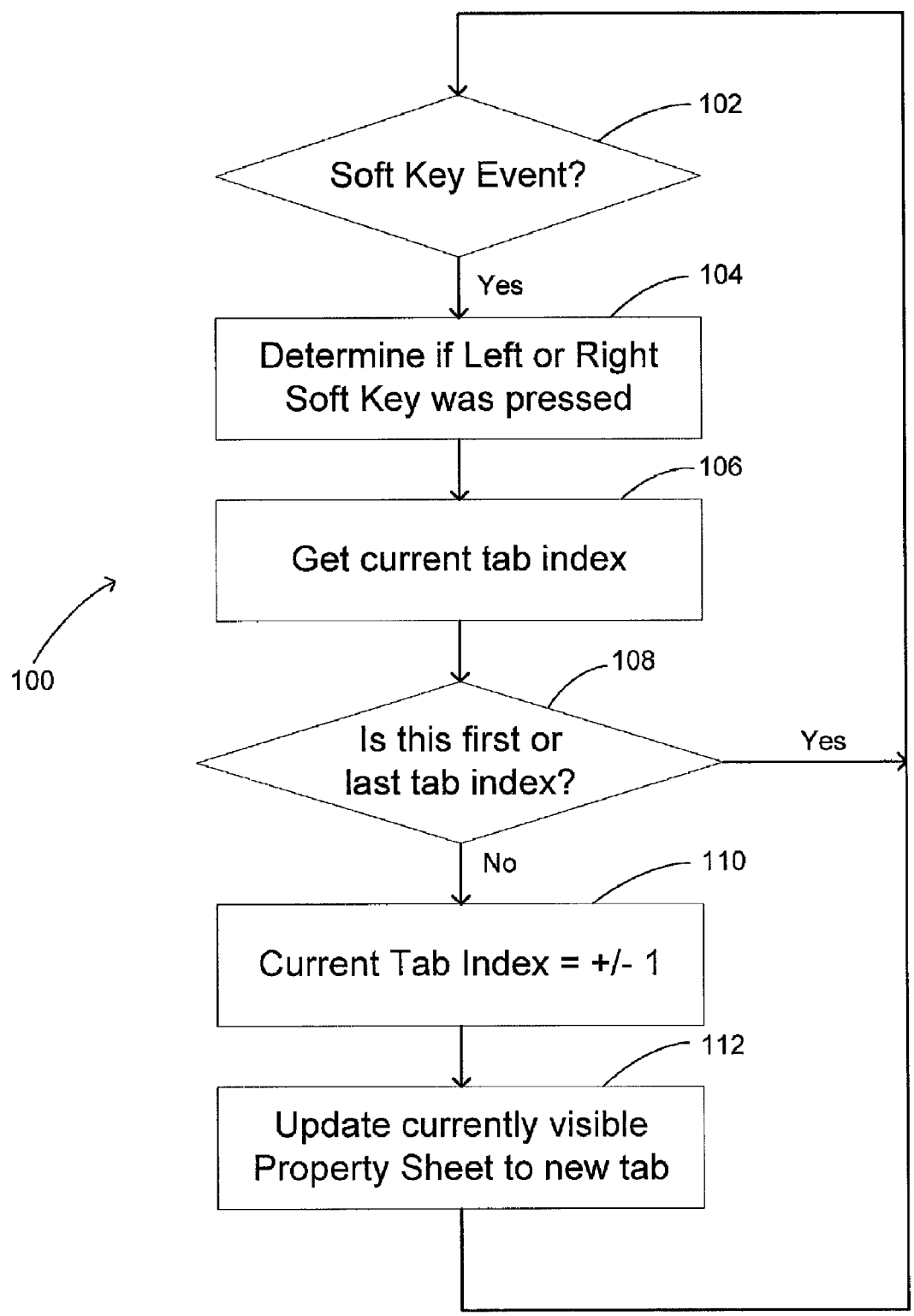
FIG. 4 shows, in flowchart form, a method for navigating between a plurality of tabbed property sheets.

Reference is now made to FIG. 4, which shows, in flowchart form, a method 100 for navigating between a plurality of property sheets on a display of a mobile electronic device. As mentioned previously, each one of these property sheets has a tab index and the tab index of the property sheet currently displayed is stored as a current tab index. The method begins in step 102 where a soft key event is detected. Next, the soft key identifier of the soft key event is determined (step 104). The current tab index is then retrieved (step 106).

In the next step (step 108), a determination is made as to whether the current tab index is a leftmost tab index or a rightmost tab index. If the current tab index is a leftmost tab index and the soft key identifier is a left identifier or if the current tab index is a rightmost tab index and the soft key identifier is a right identifier, the remaining steps shown in FIG. 4 are skipped and the navigation module 60 waits for the next soft key event. Optionally, an error message may be displayed to indicate that no further property sheets are available in the selected direction. Further, the property sheets may be arranged cyclically so that if user selects the left soft key when the current tab index is the leftmost tab index, the navigation module 60 will display the property sheet associated with the rightmost tab index.

Otherwise, the current tab index is modified based on the soft key identifier (step 110). Finally, a second property sheet of the plurality of property sheets is displayed. This second property sheet has a tab index equal to the current tab index (step 112). Once step 112 is complete, the navigation module 60 waits for the next soft key event.

The above-described embodiments of the present disclosure are intended to be examples only. Alterations, modifications and variations may be effected to the particular embodiments by those skilled in the art without departing from the scope of the disclosure, which is defined by the claims appended hereto.

The invention claimed is:

1. A method of assigning navigation functions to two soft key buttons of a mobile electronic device having a display, the assigned functions being indicated on the display, and utilising the soft key buttons to navigate between a plurality of property sheets on the display, each of the property sheets having a tab index and a layout defining a plurality of elements, wherein one of the plurality of sheets is a displayed property sheet, and one of the plurality of elements in the displayed property sheet is a current active element, the method comprising:
   assigning navigation functions to the two soft key buttons for navigating between said plurality of property sheets, the navigation functions being indicated on the display in the vicinity of the buttons;
   storing the tab index of the displayed property sheet as a current tab index;
   detecting a soft key event; and
      regardless of which of said plurality of elements is the current active element,
      modifying said current tab index based on a soft key identifier of said soft key event to create an updated tab index; and
      displaying another property sheet of said plurality of property sheets on said display, said another property sheet having a tab index equal to said updated tab index.

2. A method according to claim 1, further comprising determining said soft key identifier and/or retrieving said current tab index before said modifying of said current tab index based on said soft key identifier of said soft key event to create said updated tab index.

3. A method according to claim 1, wherein said soft key identifier is one of a left identifier and a right identifier.

4. A method according to claim 3, wherein said modifying comprises incrementing said current tab index if said soft key identifier is said right identifier and decrementing said current tab index if said soft key identifier is said left identifier.

5. A method according to claim 4, wherein said modifying comprises:
   determining if said current tab index is a leftmost tab index or a rightmost tab index, and
   performing said incrementing or decrementing unless said current tab index is a leftmost tab index and said soft key identifier is a left identifier or unless said current tab index is a rightmost tab index and said soft key identifier is a right identifier.

6. A method according to claim 1, wherein said detecting of a soft key event comprises detecting activation of one of a left soft key button and a right soft key button.

7. A method according to claim 1, wherein said two buttons are associated with two soft key icons on the display, each icon corresponding to a property sheet navigation action.

8. A method according to claim 1, further comprising defining a soft key bar within said display, said soft key bar comprising two soft key icons, said two soft key icons corresponding to two property sheet navigation actions.

9. A method according to claim 8, wherein said two property sheet navigation actions comprise left and right.

10. A method according to claim 1, wherein said modifying is performed by a navigation module and wherein the method further comprises an initial step of associating a soft key handle with said navigation module.

11. A method according to claim 2, wherein said determining is performed by a navigation module and wherein the method further comprises an initial step of associating a soft key handle with said navigation module.

12. A method according to claim 2, wherein said retrieving is performed by a navigation module and wherein the method further comprises an initial step of associating a soft key handle with said navigation module.

13. A method according to claim 1, wherein said plurality of elements within said displayed property sheet comprises a tab element, and wherein said current active element is one of said plurality of elements other than said tab element.

14. A method according to claim 4, wherein said modifying comprises:
   determining if said current tab index is a leftmost tab index or a rightmost tab index; and
   if said current tab index is said rightmost tab index and said soft key identifier is said right identifier, performing said incrementing by setting said current tab index to said leftmost tab index, and
   if said current tab index is said leftmost tab index and said soft key identifier is said left identifier, performing said decrementing by setting said current tab index to said rightmost tab index.

15. A mobile communications device, comprising:
   a display for displaying a displayed property sheet of a plurality of property sheets, each of the property sheets having a tab index and a layout defining a plurality of elements, wherein one of the plurality of elements in the displayed property sheet is a current active element;
   a first and a second soft key button, for initiating soft key events and operable to be assigned navigation functions for navigating between said plurality of property sheets, wherein the assigned navigation functions of the soft key buttons are indicated on the display in the vicinity of the buttons;
   a memory component for storing the tab index of a displayed property sheet as a current tab index;
   an operating system for detecting soft key events initiated by said soft key buttons; and
   a navigation module responsive to detection of a soft key event by said operating system after said soft keys have been assigned a navigation function to:
      modify the current tab index based on a soft key identifier of said soft key event to create an updated tab index; and
      instruct the display to display another property sheet said plurality of property sheets, the tab index of said another property sheet being equal to said updated tab index regardless of which of said plurality of elements is said current active element.

16. A mobile communications device according to claim 15, wherein said soft key identifier is one of a left identifier and a right identifier, and wherein said modifying comprises incrementing said current tab index if said soft key identifier is said right identifier and decrementing said current tab index if said soft key identifier is said left identifier.

17. A mobile communications device according to claim 15, wherein said navigation module is further configured for determining said soft key identifier of said soft key event.

18. A mobile communications device according to claim 15, wherein said navigation module is further configured for retrieving said current tab index from said memory component.

19. A mobile communications device according to claim 15, wherein said soft key event is initiated when a user depresses one of said soft key buttons.

20. A mobile communications device according to claim 15, wherein each of said soft key buttons are associated with soft key icons on the display, each icon corresponding to a property sheet navigation action.

21. A mobile communications device according to claim 16, wherein said navigation module is further configured for:
   determining if said current tab index is a leftmost tab index or a rightmost tab index; and
   performing and incrementing or decrementing unless said current tab index is a leftmost tab index and said soft key identifier is said left identifier or unless said current tab index is a rightmost tab index and said soft key identifier is said right identifier.

22. A mobile communications device according to claim 16, wherein said navigation module is further configured for:
   determining if said current tab index is a leftmost tab index or a rightmost tab index; and
   if said current tab index is said rightmost tab index and said soft key identifier is said right identifier, performing said incrementing by setting said current tab index to said leftmost tab index, and
   if said current tab index is said leftmost tab index and said soft key identifier is said left identifier, performing said decrementing by setting said current tab index to said rightmost tab index.

23. A non-transitory machine-readable medium embodying program code means executable upon a processor of a mobile communications device containing instructions for assigning navigation functions to two soft key buttons of the mobile communications device having a display, the assigned functions being indicated on the display, and utilising the soft key buttons to navigate between a plurality of property sheets on the display, each of the property sheets having a tab index and a layout defining a plurality of elements, wherein one of the plurality of sheets is a displayed property sheet, and one of the plurality of elements in the displayed property sheet is a current active element, the program code comprising:
   instructions for assigning navigation functions to the two soft key buttons for navigating between said plurality of property sheets, the navigation functions being indicated on the display in the vicinity of the buttons;
   instructions for storing the tab index of the displayed property sheet as a current tab index;
   instructions for detecting a soft key event;
   instructions for, regardless of which of said plurality of elements is the current active element, modifying said current tab index based on a soft key identifier of said soft key event to create an updated tab index; and
   instructions for displaying another property sheet of said plurality of property sheets on said display, said another property sheet having a tab index equal to said updated tab index.

24. A method according to claim 1, further comprising setting a default active element for a given property sheet, wherein said another property sheet is displayed having an active element equal to the default active element, which is not a tab.

25. A mobile communications device according to claim 15, wherein a given property sheet has a default active element, wherein said another property sheet is displayed having an active element equal to the default active element, which is not a tab.

26. A non-transitory machine-readable medium according to claim 23, wherein a given property sheet has a default active element, wherein said another property sheet is displayed having an active element equal to the default active element, which is not a tab.

* * * * *